US009162826B2

(12) United States Patent
Silva

(10) Patent No.: US 9,162,826 B2
(45) Date of Patent: Oct. 20, 2015

(54) SELF-ALIGNING, QUICK EXCHANGE, TRANSFORMABLE CONCAVE BELT CONVEYOR

(76) Inventor: Hamilton da Penha Lage Silva, Itabira (BR)

( * ) Notice: Subject to any disclaimer, the term of this patent is extended or adjusted under 35 U.S.C. 154(b) by 0 days.

(21) Appl. No.: 14/375,784

(22) PCT Filed: Jul. 4, 2012

(86) PCT No.: PCT/BR2012/000238
§ 371 (c)(1),
(2), (4) Date: Jul. 30, 2014

(87) PCT Pub. No.: WO2013/113082
PCT Pub. Date: Aug. 8, 2013

(65) Prior Publication Data
US 2015/0053535 A1    Feb. 26, 2015

(30) Foreign Application Priority Data

Jan. 30, 2012 (BR) .......................... 1020120020211

(51) Int. Cl.
B65G 39/04    (2006.01)
B65G 15/60    (2006.01)
B65G 39/12    (2006.01)
B65G 15/08    (2006.01)

(52) U.S. Cl.
CPC .............. *B65G 39/125* (2013.01); *B65G 15/08* (2013.01); *B65G 15/60* (2013.01); *B65G 39/04* (2013.01); *B65G 39/12* (2013.01)

(58) Field of Classification Search
CPC ...... B65G 39/04; B65G 39/12; B65G 39/125; B65G 15/08; B65G 15/60; B65G 15/62

USPC .......................... 198/824, 825, 828, 834, 835
See application file for complete search history.

(56) References Cited

U.S. PATENT DOCUMENTS 3,047,131 A * 7/1962 Duncan ......................... 198/827
3,068,995 A * 12/1962 Poundstone .................. 198/824
3,126,090 A * 3/1964 Bitzer ........................... 198/824

(Continued)

*Primary Examiner* — Mark A Deuble
(74) *Attorney, Agent, or Firm* — Caesar Rivise, PC

(57) ABSTRACT

The invention relates, in particular, to a self-aligning, quick exchange, transformable concave belt conveyor (FIG. 1). The combined solutions allow components worn by continuous use of the equipment to be quickly replaced, the load to be carried in a stable manner, auxiliary aligning components to be dispensed with and, above all, belts of different widths and rollers with different angles of inclination to be used in the same structure. The main component is the integral segmented catenary, with a flexible shaft, roller cage with a ball seat and self-locking connection fastening (FIG. 2). The bench is hinged to a telescopic support that allows changing the angle of inclination of the roller, and widening or narrowing the structure belts of different widths, forming a self-alignment rocker (FIG. 3). The conveyor has a driving drum driven in a special manner, the drum being telescopic and formed by radial tubes attached to the side and central reflectors, producing the telescopic effect (FIG. 4) for respective belt widths. The drum also has a shaft device with a fitted tip, instead of an integral shaft, thus enabling fast replacement (FIG. 5). Finally, another innovation of the conveyor is the mobile structure with interconnections of the U-shaped profile by means of telescopic tubes (FIG. 6) which allow the width to be expanded or reduced in order to adapt the conveyor to particular belt widths. The invention is particularly useful in the field of concave belt conveyors.

12 Claims, 6 Drawing Sheets

(56) References Cited

U.S. PATENT DOCUMENTS

| | | | |
|---|---|---|---|
| 3,141,543 A * | 7/1964 | Madeira | 198/501 |
| 3,211,276 A * | 10/1965 | Dilgard | 198/827 |
| 3,700,092 A * | 10/1972 | Stark et al. | 198/824 |
| 4,144,964 A * | 3/1979 | Valcalda | 198/830 |
| 4,376,643 A * | 3/1983 | Kahle et al. | 65/351 |
| 4,787,504 A * | 11/1988 | Schultz | 198/782 |
| 2005/0126894 A1* | 6/2005 | Forman | 198/825 |
| 2014/0083822 A1* | 3/2014 | Swinderman et al. | 198/827 |

\* cited by examiner

SELF-ALIGNING, QUICK EXCHANGE, TRANSFORMABLE CONCAVE BELT CONVEYOR

BACKGROUND OF THE INVENTION

The concave conveyor belt is a kind of equipment for transferring material continuously. The belt works under the effect of frictional forces becoming a component to transfer not only the material but also an important component to transfer force.

The concave conveyor belt is an advanced structure and has a high capacity for transfer and the distance, on the other hand, is long. It is widely used in mining, metallurgical and coal industry to transfer sand and raw material, or packaged material. In many situations, it is a very important component of nonstandard machinery.

Concave belt conveyors are known in the state-of-the-art, but different from those presented here.

In the search performed in the patents banks some patents relating to elements of this technology, in particular rollers and belt guides were found.

For example, MU 7200838-5 and MU 8000059-2Y1 address rollers, which features a flexible shaft of steel cable, a monoblock assembly, a box of bearings, bearings and support of the load roller, but in more detailed analysis we can see the complexity of their construction with some problems of technical and economic infeasibility, as the cost of the manufacturing tooling and the compositional elements of the roller.

It appears therefore that the technologies currently used present serious problems and deficiencies, such as that existing technology is specific to the activity that was designed and allows no dimensional changes without complete replacement of components in order to be used in another function; they need 02 (two) or 03 (three) rollers in order to get the concavity of the belt; the wear of the belt and rollers is high due to the stiffness of the structure and materials in contact (steel-rubber-ores); bearings require complex seals and, nevertheless, become contaminated, which leads to breaks and locks, causing cuts and wear of the belt; the conveyor needs special accessories for belt alignment and increase the traction of the driving cylinder; maintenance of cylinders and rollers is complex, especially with the conveyor with load, high downtime, the need for large team and cargo equipment; difficulty handling spare parts, mainly due to distances and work-time of the carriers Companies; need for large inventories of spare parts, load roller, impact roller, return roller, for each belt dimension; rollers support, due to its configuration, they accumulate material endangering the equipment; instability of the load by the conformation given by rollers gutter; breaking the belt due to deformation in the transition of the rollers.

Thus, the state-of-the-art features with respect to the conveyor belt, problems of an economic and security nature, human resources, maintenance, optimization of the process and the parts used, among others. Such problems are solved by new technology, the subject matter of this patent.

SUMMARY OF THE INVENTION

The present invention relates to a transformable concave conveyor belt with auto-leveling and rapid exchange (FIG. 1) with advantages over the state-of-the-art, since in addition to remedy the problems it meets the demand of users in order to facilitate the replacement of components that wear out with the continued use of the equipment.

Especially, this new technology allows a versatility in its use with respect to increase the flow rate, the product change, reducing inventories of spare parts, reducing downtime for maintenance, less wear and tear of the belt, with the consequent increase of its life cycle, simplifying the alignment of the belt and constructively high-traction of the driving cylinder, they presented innovative solutions to existing problems in the state-of-the-art and hitherto unsolved.

The Concave Conveyor Belt, object of the present invention, is transformable by using structure, easel and telescopic barrel, changing its settings for belt width, which allows to change the flow rate of the conveyor for different applications from the original; its slope is variable to the concavity of the belt that best suit the material transported and its slope can be changed at any point of the conveyor when necessary and the conformation of the belt is natural, circular in shape, following the bend thereof. This flexibility, in accordance with the concavity of the conveyor belt, produces a uniform support to it, increasing its life cycle.

The concave conveyor belt have a rapid exchange due to the constructive elements allow maintenance without requiring lifting of the belt, which is a problem of the state-of-the-art, since the elevation of the belt for maintenance requires load equipment and elevation in places of difficult access and offering risk for maintainers.

On the other hand in this invention the driving and driven cylinders, were also designed with shafts in interchangeable mounted points, allowing rapid exchange of the shafts and bearings, which greatly reduces the time and cost of maintenance of equipment, and complete the resources for the rapid exchange, the easel of the structure mounted through interchangeable pins, unlike the prior state-of-the-art that uses welded structure.

The Concave Conveyor Belt is auto-leveling because the easel have articulated vertical support, producing the form of arch, which allows the rocker effect, essential to follow the movement of the belt and/or irregularity of the charge in weight and lodging, thus promoting the auto-leveling of the conveyor belt.

BRIEF DESCRIPTION OF THE DRAWINGS

The invention will be described in conjunction with the following drawings in which like reference numerals designate like elements and wherein.

DETAILED DESCRIPTION OF PREFERRED EMBODIMENTS

Figure 1:
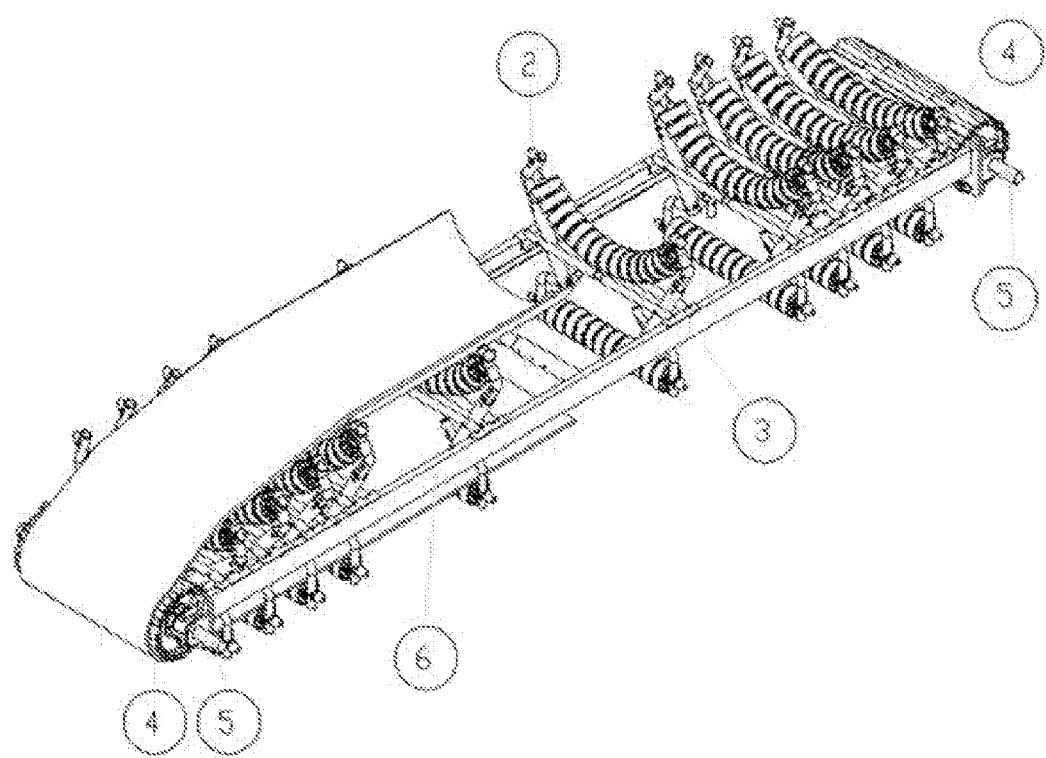
FIG. 1 is a partially cut-away perspective view of an embodiment of a transformable concave conveyor belt of the invention.
Figure 2:
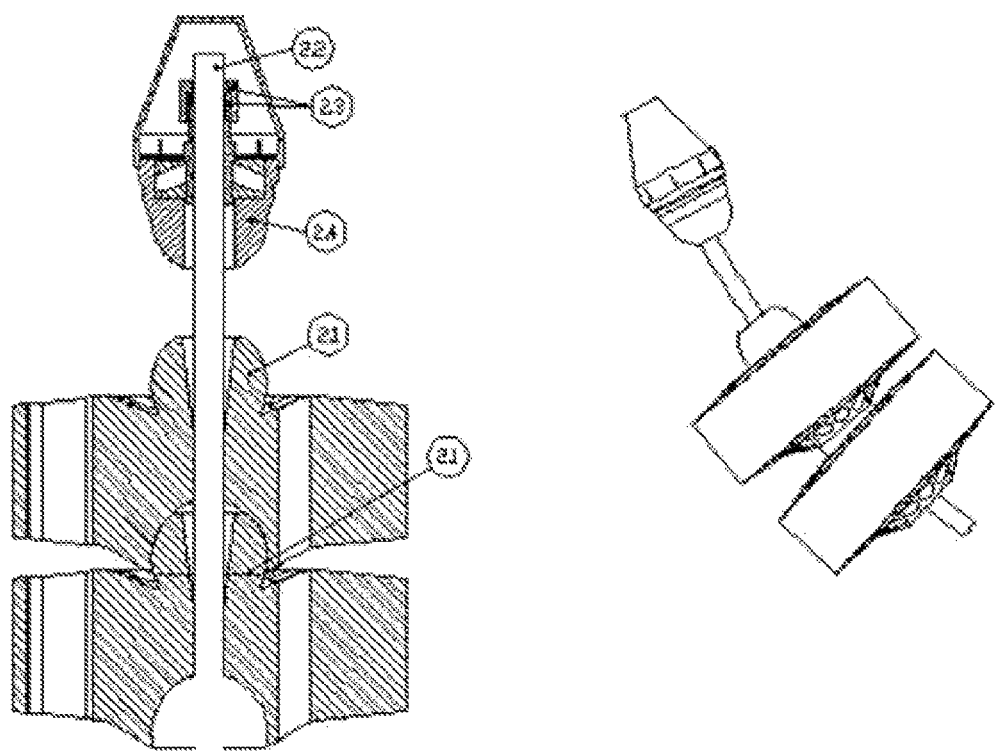
FIG. 2 shows an embodiment of a roller of the invention in cross-section (left) and perspective (right) views.

The first component developed for the transformable concave conveyor belt with auto-leveling and rapid exchange is the entire roller (FIG. 2), which is produced in sliced catenary with flexible shaft.

The roller is characterized by the assembly of injected or molded individual rollers (2.1), assembled piece by piece in order to form the set in sliced catenary, in the desired width and thus standardize the rollers on any conveyor, it is compound with labeled male-female fitting and lateral angle of catenary anchor, and the swivel allows the slope of the rollers forming the support arch of the belt in the degree for the desired concavity producing the best lodging solving the fatigue problem of the belt existing in the prior state-of-the-art.

The flexible shaft of the roller is a steel cable that passes through the center of the rollers and tracks the assembly curvature (2.2), commercial steel cable cut in the length of the assembly width of the conveyor with the advantage of being from direct application without accessories and complementary operations; the steel cable is attached to the ends using a connection of penetrating tapered steel ring through the tapered sliding and compression locking nut (2.3), extremely important for the rapid exchange of the roller or their elements.

The support is made by a bearing housing with a swivel basis (2.4) at each end, in order to follow the slope of the roller without folding the steel cable, shielding cap in injectable thermoplastic, which reduces the manufacturing cost and facilitates disassembly for repair, replacement and dimensional changes.

The invention also has only one commercial tapered roller bearing at each end, saving 04 bearings, and the tapered roller bearings are for turning the roller. This mechanism solves the breaking or locking problem of the bearings, reduced to two, they support radial and axial loads, and work at level above the load, free from further contamination, contrary to the state-of-the-art working under the load.

Figure 3:
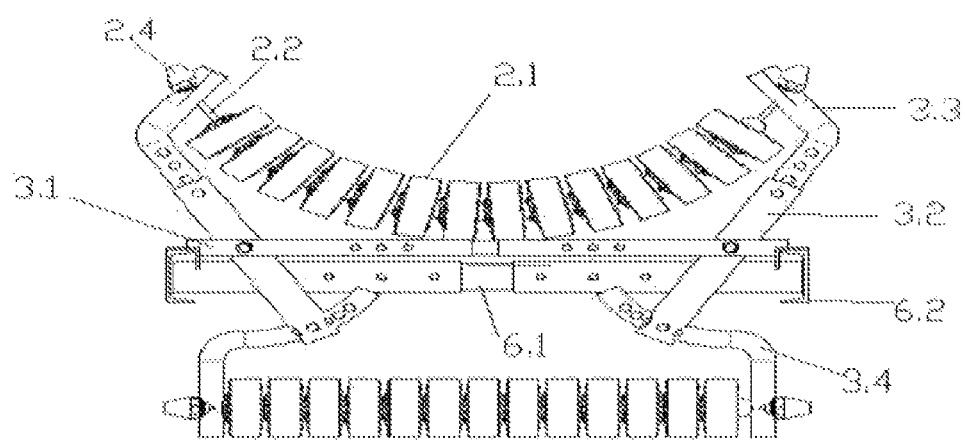
FIG. 3 is a front view of an embodiment of an easel of the invention.

The easel (FIG. 3) is a double support of the hinged roller (load and return), adjustable width and concavity of the belt, and consists of 02 (two) hinged bearings tubes (3.1), with central tube (3.2), which receives the supports tubes with smaller diameter in the telescopic assembly. The support tubes, upper (3.3) and lower (3.4), are gradually drilled at one end for adjusting the slope of the roller, embossed on the other end for housing the bearing box with swivel base, and have an open channel in the housing of the box, which allows the removal of the roller, without dismantling it, in the rapid exchange process, streamlining and rationalizing this procedure. This assembly of the easel with flexible roller allows free conformation of the load and auto-leveling the belt.

Figure 4:
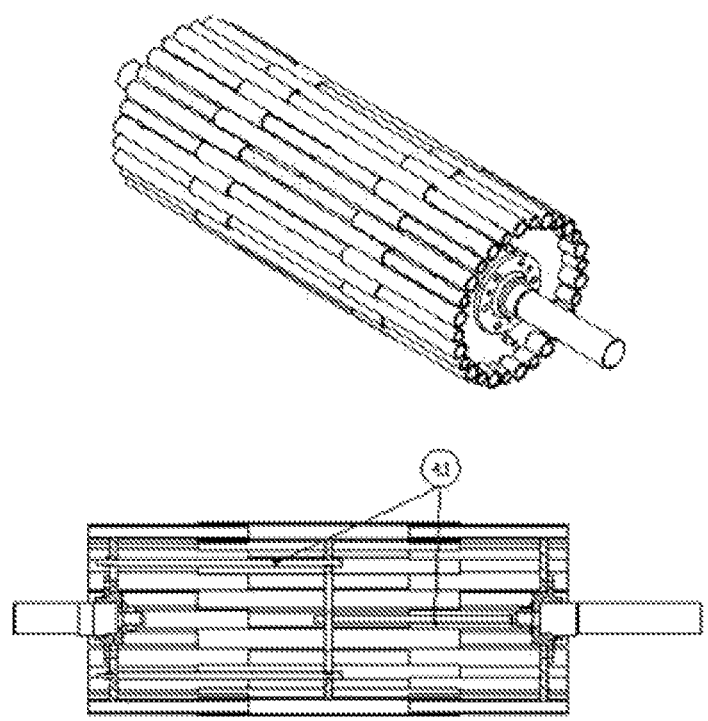
FIG. 4 shows an embodiment of a telescopic cylinder of the invention in perspective (top) and cross-section views (bottom)

The driving and driven cylinder are telescopic (FIG. 4), which allows adjustment of the width of the cylinder, adapting it to various belt widths, and can therefore be used in other conveyors and new operating conditions, without restriction, which reduces the need to stock of various spare cylinders.

Figure 5:
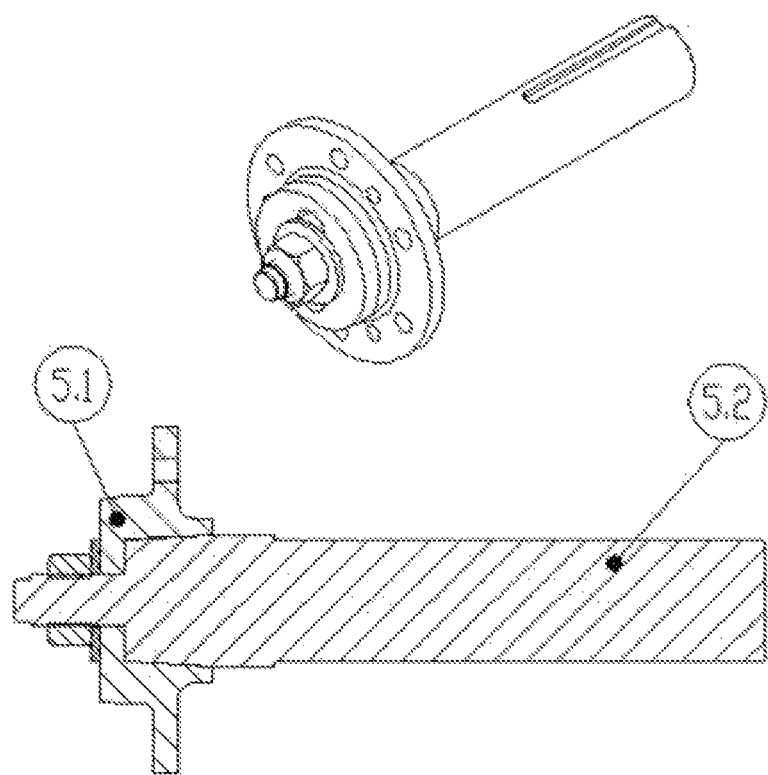
FIG. 5 shows an embodiment of a hub of the invention in perspective (top) and cross-section views (bottom)

The cylinder has a special constructive shape, is formed by the radial distribution of welded pipes in the external mirrors, and in the center mirror the alternating radial tubes form the telescopic with side tubes, and the expansion or reduction is performed through the reverse spindles in the side mirrors (4.1). The cylinder also has a tip-mounted shaft device, replacing the integral shaft used today, which allows rapid exchange (FIG. 5).

The tip-mounted is made of a hub (5.1) set by radial screws in the mirror, and hub has seat in the Morse taper, which receives the shaft end (5.2), also in Morse taper, with cross key between shaft/hub and fastening a traction nut of the taper.

The elimination of the integral shaft reduces the weight of the set and rapid exchange of the bushing, bearings and tips without removal of the cylinder. The system allows the standardization of components, reducing inventories of spare parts.

Figure 6:
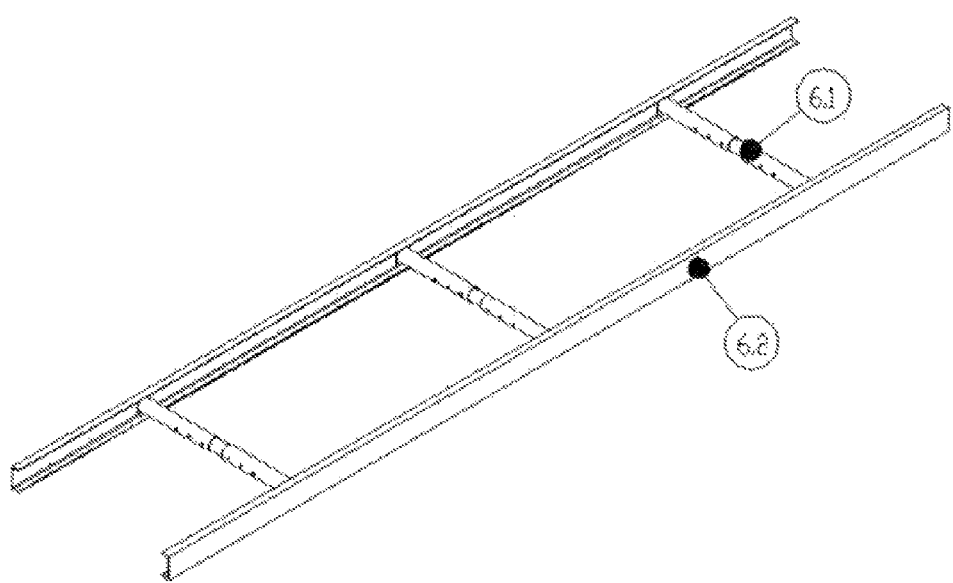
FIG. 6 is a perspective view of an embodiment of a transformable structure of the invention.

Finally, accompanying the innovation elements of the conveyor the transformable structure (FIG. 6), through interconnections of "U" profile (6.2) through telescoping tubes (6.1), gradually drilled, secured by locking pins, to expand or reduce the width of the belt, adjusting the conveyor to certain belt widths.

Therefore, the TRANSFORMABLE CONCAVE CONVEYOR BELT WITH AUTO-LEVELING AND RAPID EXCHANGE, described herein, has important innovation and advantages over the prior state-of-the-art contributing to the development of this technology area by the presented solutions to existing problems.

The invention claimed is:

1. A conveyor belt, comprising:
   rollers;
   a belt situated on the rollers so as to form a concave load conveyor that allows the transport of a load continuously,
   a hinged tubular easel with variable width,
   a flexible shaft integral roller,
   a tapered roller bearing box with self-locking connection of cylinders, and
   telescopic tubes having variable width with shafts in interchangeable mounted points,
   wherein the conveyor belt is transformable with auto-leveling and rapid exchange.

2. The conveyor belt according to claim 1, which is configured to adjust to different widths and concavity of the conveyor belt.

3. The conveyor belt according to claim 1, wherein the hinged tubular easel is mounted on telescoping tubes, in order to enable variation of a width and slope angle, enabling a change of concavity of the belt, as well as an articulation of the easel producing a rocker effect that jointly to the tapered roller bearing box and flexible shaft integral roller, in sliced catenary, allow free conformation of the load and auto-leveling the belt.

4. The conveyor belt according to claim 1, wherein the flexible shaft integral roller comprises an assembly of several rollers, with male-female labeled fitting and lateral anchor angle of a catenary, manufactured in injected thermoplastic with high-resistance to abrasion, in a diameter suitable for the load to be transported.

5. The conveyor belt according to claim 1, wherein a shaft of the flexible shaft integral roller comprises commercial steel cable, cut to a desired length for a width of the belt.

6. The conveyor belt according to claim 5, wherein locking of the steel cable in ends of the flexible integral roller is a rapid exchange element, fixed by a slip tapered seat connection, a tapered steel penetration ring, and a compression lock and a nut of a penetration ring.

7. The conveyor belt according to claim 5, wherein the steel cable is supported at its ends by a tapered roller bearings housing, shielded, permanently lubricated, made from injected thermoplastic, with its base in swivel shape, to adjust a slope angle of the roller without folding the steel cable.

8. The conveyor belt according to claim 1, wherein the easel comprises carbon steel tubes with a swivel assembly of central supports through demountable pins, in order to produce a rocker effect and the rapid exchange of components, the bearings are formed by two telescopic tubes in parallel, to adjust the width of the belt, welded at one end to a support bracket and setting in a girder.

9. The conveyor belt according to claim 1, wherein in the easel central supports are mounted in reverse slope in order to form the cradle of the belt and dimensioned to receive supports tubes, upper and lower with smaller diameter, which are printed at one end, for seating the tapered roller bearing box on a swivel base and a channel for extraction of the roller, for rapid exchange of the roller and at the other end the support tubes are gradually drilled for adjustment of a slope of the roller and fixed by demountable pins.

10. The conveyor belt, according to claim 1, wherein driving and driven cylinders are formed by commercial carbon steel tubes junction, radially distributed in external and central mirrors, in alternated telescopic assembly and spindles make opening and closing of the cylinders for adjustment of a width of the belt.

11. The conveyor belt according to claim 10, wherein the driving and driven cylinders are assembled in shafts with rapid exchange called tip-mounted comprising a hub with the fastening flange in the mirror and hole in Morse taper for assembling the shaft ends, also in Morse taper, with shaft/hub cross key, locked by a traction nut of the taper.

12. The conveyor belt according to claim 1, wherein girders of the transformable structure are displaceable through interconnections in "U" profile for telescopic tubes, gradually drilled, secured by locking pins for width expansion or reduction, adjusting the conveyor to certain belt widths.

\* \* \* \* \*